(12) United States Patent
Kreiner

(10) Patent No.: US 8,897,836 B2
(45) Date of Patent: Nov. 25, 2014

(54) EXTENDING THE FUNCTIONALITY OF A MOBILE DEVICE

(75) Inventor: Barrett Kreiner, Woodstock, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 251 days.

(21) Appl. No.: 13/313,196

(22) Filed: Dec. 7, 2011

(65) Prior Publication Data

US 2013/0149964 A1 Jun. 13, 2013

(51) Int. Cl.
*H04M 1/00* (2006.01)
*H04B 1/38* (2006.01)

(52) U.S. Cl.
USPC .......... 455/557; 455/41.2; 455/418; 455/420; 455/556.1; 455/575.1; 455/575.8

(58) Field of Classification Search
USPC ............. 455/418, 420, 41.1, 41.2, 550.1, 455/556.1–556.2, 557, 575.1, 575.8, 455/90.1–90.3
See application file for complete search history.

(56) References Cited

U.S. PATENT DOCUMENTS

| | | | | |
|---|---|---|---|---|
| 6,771,981 | B1 * | 8/2004 | Zalewski et al. | 455/557 |
| 6,898,283 | B2 * | 5/2005 | Wycherley et al. | 379/433.11 |
| 7,079,864 | B2 * | 7/2006 | Engstrom et al. | 455/557 |
| 7,577,462 | B2 * | 8/2009 | Kumar | 455/557 |
| 8,284,164 | B2 * | 10/2012 | Han | 345/173 |
| 8,384,683 | B2 * | 2/2013 | Luo | 345/173 |
| 8,478,351 | B2 * | 7/2013 | Hong et al. | 455/566 |
| 2003/0006968 | A1 * | 1/2003 | Solomon | 345/168 |
| 2008/0316181 | A1 | 12/2008 | Nurmi | |
| 2009/0219260 | A1 | 9/2009 | Bick | |
| 2010/0328222 | A1 | 12/2010 | Wong | |
| 2012/0007822 | A1 * | 1/2012 | Luo | 345/173 |

OTHER PUBLICATIONS

Simon, "Nokia 888 Communicator", Mobile Whack, Feb. 21, 2009, http://www.mobilewhack.com/nokia-888-communicator/#. TpdLQpsr0Rs.
Jason Chen, "Motorola Cliq Review", Gizmodo, Oct. 14, 2009, http://gizmodo.com/5381995/motorola-cliq-review.
Vincent Nguyen, "Motoroal BACKFLIP review", Slash Gear, Mar. 3, 2010, http://www.slashgear.com/motorola-backflip-review-0376567/.
Nick Jones, "Top 10 Concept Phones", Know Your Mobile, Feb. 9, 2010, http://www.knowyourmobile.com/features/412982/top_10_concept_phones.html.
Matthew Newill, "Apple Peel 520 iPod touch Phone Case", Gadget Venue, Aug. 6, 2010, http://www.gadgetvenue.com/apple-peel-520-ipod-touch-phone-case-08062156/.
Gadgetcrave.com, http://gadgetcrave.com/wp-content/uploads/2009/12/synaptics-fuse-540x313.jpg.

* cited by examiner

*Primary Examiner* — Tuan A Tran
(74) *Attorney, Agent, or Firm* — Hartman & Citrin LLC

(57) ABSTRACT

Devices, systems, and methods are disclosed for extending the functionality of a mobile device by including a cover for the mobile device with a substantial portion of the exterior overlaid with a touch-sensitive surface. Logic stored on the cover senses a user's touch on the touch-sensitive surface, and transmits the touch input to the coupled mobile device. Logic stored on the coupled mobile device may receive and interpret the touch input as a function or command of an operating system, or a function or command of a program within the operating system of the mobile device.

17 Claims, 8 Drawing Sheets

EXTENDING THE FUNCTIONALITY OF A MOBILE DEVICE

BACKGROUND OF THE SUBJECT DISCLOSURE

1. Field of the Subject Disclosure

The subject disclosure relates to mobile devices. More specifically, the subject disclosure relates to extending the functionality of a mobile device.

2. Background of the Subject Disclosure

Smarter and more capable mobile devices today are increasingly prone to being damaged. Some are scratched through coming into contact with the surrounding environment while others are broken after an inadvertent drop. Since damaged components may be expensive to replace, particularly touch-screen displays, many mobile devices used by consumers today have an accompanying cover that may be intended to protect the mobile device. However, for many, the use of a cover means that practically every location on the surface of the mobile device other than a display and/or a keypad is rendered unusable. Many simple and mundane tasks become more difficult to perform due to inaccessibility of the corresponding buttons that are rendered inaccessible by the cover. For example, adjusting the volume through buttons located on the sides of a mobile device, or taking pictures through designated buttons on the mobile device, may be more cumbersome, simply because of the cover used on the mobile device. Other mobile devices having touch-screens may not include any physical buttons, leaving the remainder of the surface of the mobile device covered by the cover and therefore unusable.

SUMMARY OF THE SUBJECT DISCLOSURE

In one example embodiment, the subject disclosure may be an apparatus for extending the functionality of a mobile device. The apparatus may include a cover adapted to be applied to the mobile device, a touch-sensitive surface overlaying a substantial portion of an exterior of the cover, and a logic in communication with the touch-sensitive surface, the logic for sensing a touch input from the touch-sensitive surface, and transmitting the touch input to the mobile device.

In another example embodiment, the subject disclosure may be a logic stored on a computer-readable medium on a mobile device that, when executed, may instruct a processor to extend functionality of a mobile device having a cover applied thereon, the cover including a touch-sensitive surface overlaying a substantial portion of an exterior of a cover of the mobile device. The logic includes an instruction to receive a touch input from the cover, and an instruction to associate the touch input with a function usable by an operating system of the mobile device.

In yet another example embodiment, the subject disclosure may be a logic stored on a computer-readable medium that, when executed, may instruct a processor to extend functionality of a mobile device having an operating system. The logic includes an instruction to sense a touch input from a touch-sensitive surface of a cover of the mobile device, the touch-sensitive surface overlaying a substantial portion of an exterior of the cover, and an instruction to transmit the touch input to the mobile device. The mobile device receives and associates the touch input with a function usable by the operating system.

DETAILED DESCRIPTION OF THE SUBJECT DISCLOSURE

The subject disclosure provides devices, systems, and methods for extending the functionality of a mobile device. Example embodiments of the subject disclosure may include a cover for the mobile device. A substantial portion of an exterior of the cover may be overlaid with a touch-sensitive surface. The cover may include an output that may enable one-way or bilateral communication with the mobile device when coupled. This output can be a contactless circuit such as a Radio Frequency Identification (RFID) chip or a Near-Field Communication (NFC) chip, a wireless transmitter/transceiver, a direct electrical connection via an interface, etc. The output may be used to transmit a touch input to the mobile device coupled to the cover. The coupled mobile device may include a reader of the output, such as a receiver/transceiver, data port, etc. to receive the touch input from the cover. Logic stored on the cover senses a user's touch on the touch-sensitive surface, and transmits the touch input to the coupled mobile device through the output. Logic stored on the coupled mobile device may receive and interpret the touch input as a function. The function may be a function or command of an operating system, or a function or command of a program within the operating system of the mobile device. In certain example embodiments, the cover may use passive RFID or NFC chips, which may require no more power than that which may be received from the radio signals transmitted by the transceiver on the mobile device. In other example embodiments, a battery may power the components of the cover, and can be charged through a data port on the mobile device, a solar panel, a kinetic charger, etc.

There are many different ways to embody the subject disclosure. For simplicity, the following example embodiments present, for the most part, a minimal amount of structure necessary to achieve the functions of the subject disclosure. In many of the following example embodiments, one device, network, terminal, memory, logic, etc. is shown where a plurality may be used in tandem to achieve the same function. Those having skill in the art will recognize these pluralities, which are within the scope of the subject disclosure.

Figure 1A:
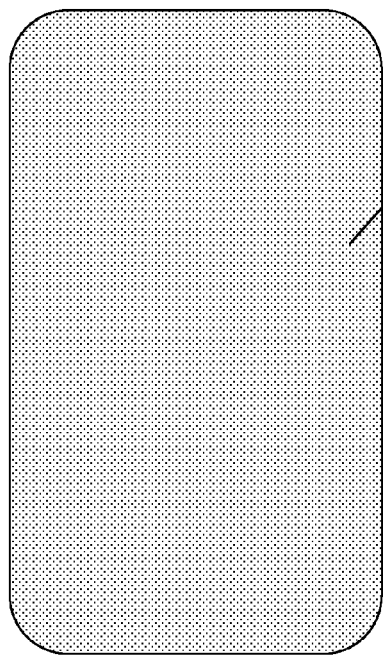
FIGS. 1A-1C show a cover for extending the functionality of a mobile device, according to an example embodiment of the subject disclosure.
Figure 1B:
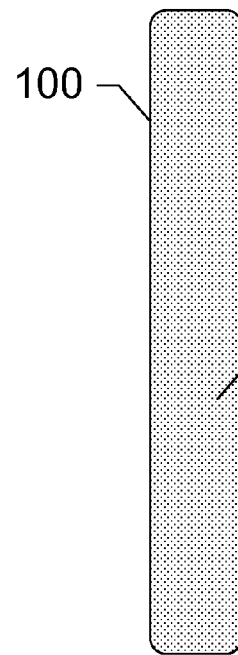
Figure 1C:
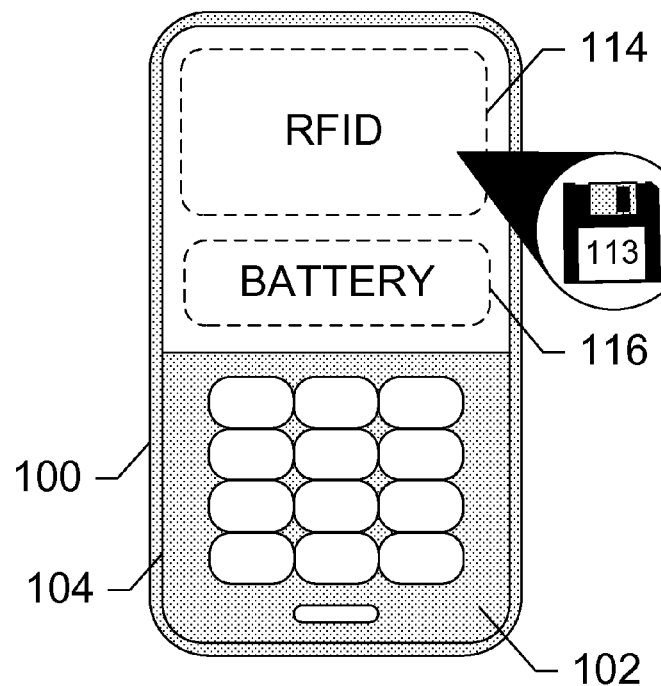

FIGS. 1A-1C show back, side and front views, respectively, of a cover 100 for extending the functionality of a mobile device, according to an example embodiment of the subject disclosure. Cover 100 may be adapted to be coupled to a mobile device, and may include a touch-sensitive surface 102 overlaying a substantial portion of an exterior surface area of the cover. Touch-sensitive surface 102 may receive touch input from a user. The touch input may be forwarded to the coupled mobile device where it may be interpreted as a function, as further described herein. FIG. 1A shows a back view of cover 100. Cover 100 may be made from any rigid or flexible material such as plastics, metals, rubbers, ceramics, etc. The exterior surface area of cover 100 may be substantially overlaid by touch-sensitive surface 102. Touch-sensitive surface 102 may incorporate any presently known or later developed touch-sensitive technologies including Multi-touch Capacitive Technology, Touch Resistive Technology, Multi-touch Optical Technology, Touch Wave Technology, Force Based Sensing, Near Field Imaging, etc., and combinations thereof. FIG. 1B shows a side view of cover 100 having touch-sensitive surface 102, illustrating how touch-sensitive surface 102 may extend across the corners and into the side surfaces of cover 100.

The mobile device can be an electronic device capable of wirelessly sending and receiving, even if this may not be the primary function of the device. Examples of such devices may include, but are not limited to, cellular telephones, personal digital assistants (PDAs), portable computers, consumer electronics, appliances, etc.

FIG. 1C shows a front view of cover 100 having a front plate 104 for a mobile device having input buttons. A substantial portion of front plate 104 may be overlaid in touch-sensitive surface 102, thereby further extending the functionality of a coupled mobile device. Cover 100 may include an output, such as RFID chip 114. RFID chip 114 may be used to output to the coupled mobile device a signal corresponding to a touch input received at touch-sensitive surface 102. RFID chip 114 can incorporate any presently known or later developed communication technologies including passive RFID, active RFID, NFC technology, etc. Furthermore, RFID chip 114 may include a touch-surface logic 113 through which a touch input applied at touch-sensitive surface 102 may be sensed and transmitted to the coupled mobile device. Touch-surface logic 113 can be based on any presently known or later developed technologies including digital and/or analog hardware circuits, etc. A battery 116 may provide power for RFID chip 114. Battery 116 can include any of the presently known or later developed technologies used in mobile devices or used in powering communication components similar to RFID chip 114, including thin printed carbon zinc batteries, watch batteries, rechargeable batteries, etc.

In other example embodiments, the battery can be charged by a charger coupled to the cover. The charger may utilize solar energy, kinetic energy, or any other renewable or non-renewable energy resource.

In other example embodiments, the cover may include a computer-readable memory on which a touch-surface logic may be stored. The computer-readable memory can be any presently known or later developed technologies, including RAM (random access memory), flash memories, ROMS (read-only memories), EPROMS (erasable programmable read-only memories), EEPROMS (electrically erasable programmable read-only memories), or any other storage device or medium. When the touch-surface logic receives a touch input applied at the touch-sensitive surface, the touch-surface logic may instruct a processor to transmit the touch input to the mobile device via an output, such as RFID 114. The processor can incorporate any presently known or later developed technologies including computer processors (processing units), microprocessors, digital signal processors, controllers and microcontrollers, etc. A data/power port may be coupled to the cover and may be in communication with the other components of the cover. For instance, the port may connect with a complementary port on a coupled mobile device. When connected, the cover port may serve as an output for touch input, facilitate data transfer between the cover and the coupled mobile device, and receive power from the coupled mobile device. The cover port can be made up of a plurality of electrical contacts that match up with electrical contacts on a mobile device when coupled to the mobile device. In other example embodiments, the data/power port can be any wired connection such as a universal serial bus (USB) connection, firewire, serial, parallel, or any proprietary data interface.

Figure 2A:
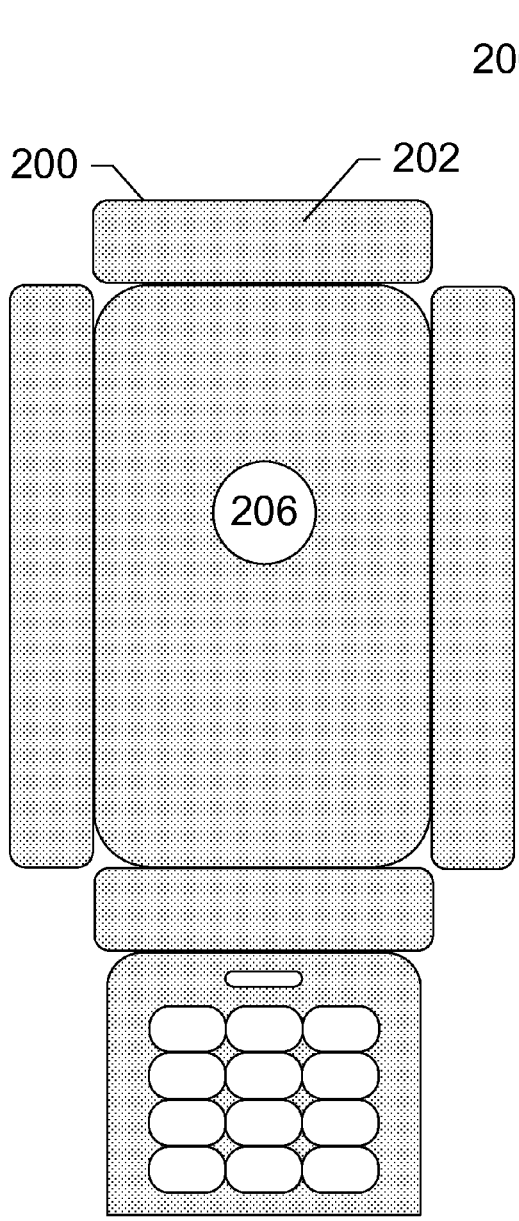
FIGS. 2A-2B show an adhesively applied cover for extending the functionality of a mobile device, according to an example embodiment of the subject disclosure.
Figure 2B:
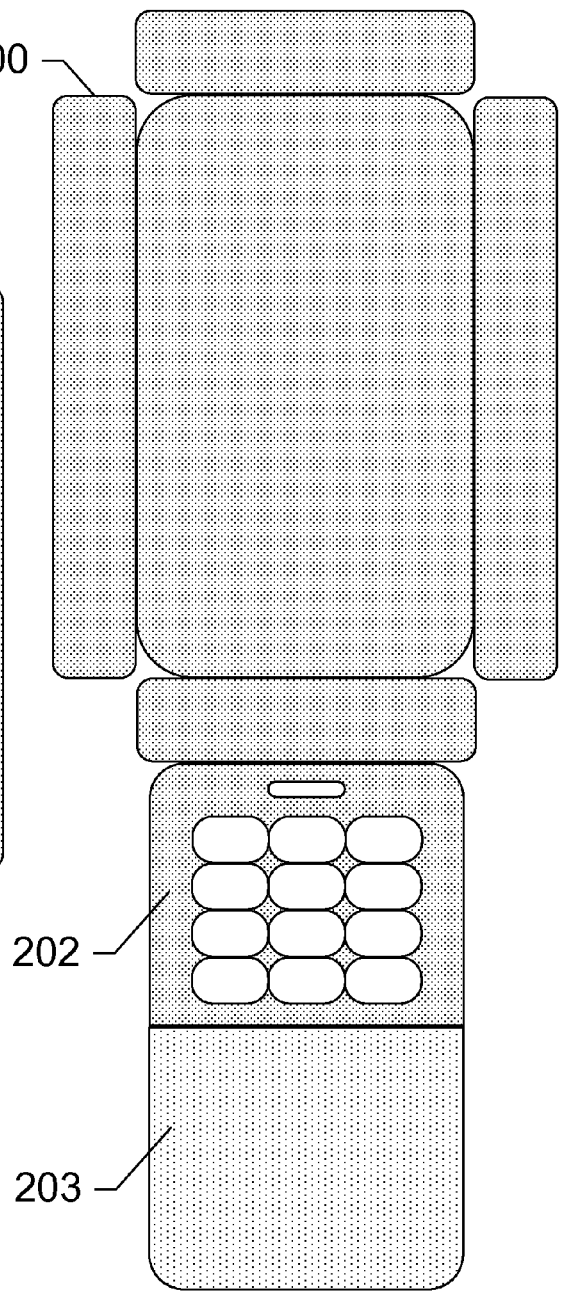

FIGS. 2A-2B show a cover 200, which may be adhesively applied, for extending the functionality of a mobile device, according to an example embodiment of the subject disclosure. FIG. 2A shows an open view of the cover 200 that may be applied to the mobile device adhesively. Cover 200 may be made from any flexible material such as plastics, metals, etc. A substantial portion of the exterior of cover 200 may be overlaid by touch-sensitive surface 202, with the exception of an optional logo window 206. Logo window 206 may be a gap or a cutout in cover 200 where a logo or other identifier of the coupled mobile device may be viewed through the cover, and creates a gap in touch-sensitive surface 202 as well. Cover 200 may be designed to fold around the edges of a mobile device. An adhesive may be applied to an interior surface of cover 200 to enable coupling to the mobile device. For shipping, handling, and retail purposes, this interior surface including the adhesive may be preserved with a removable layer, such as wax paper, plastic, etc., that may be removed by a user before applying the cover to the mobile device. Though cover 200 may include one or more sections of touch-sensitive surface which may be wrapped around the mobile device during application to the mobile device, once applied the mobile device can be calibrated for detecting motion across one section to the next. When applied to a mobile device, each side of cover 200 may contact at least one other side of cover 200. This may be useful for touch inputs encompassing more than one section, such as a tactile motion starting from the back of the cover, moving up and over the top of the cover, then down the front of the cover. Other more complex or elaborate touch inputs may be enabled with different configurations of the sides and edges of the cover being in contact. For instance, a sensing logic embedded within cover 200 as described above may detect a configuration based on contact made between different portions and edges of cover 200, and may adapt its input-sensing capabilities accordingly. Further, sides and edges of covers may be provided using perforations, notches, fold lines, etc. in the material of a cover in different configurations, enabling various methods for coupling a cover to a mobile device.

FIG. 2B depicts a cover 200, which may be adhesively applied, for extending the functionality of a mobile device, according to an alternative example embodiment of the subject disclosure. In this example, cover 200 may be substantially similar to the one shown in FIG. 2A but also include a transparent touch-sensitive surface 203. When cover 200 is applied adhesively to the mobile device as described herein, transparent touch-sensitive surface 203 may cover a display of the mobile device. Once applied, transparent touch-sensitive surface 203 may enable the area over the display to be capable of sensing any touch input. This may be particularly useful for older or damaged mobile devices. For instance, if a mobile device does not have touch-sensitivity or has lost touch-sensitivity in the display, then transparent touch-sensitive surface 203 can be applied to make the display touch-sensitive. Logic on the mobile device may allow the mobile device to receive and recognize touch input from a new or additional touch-sensitive surface, such as touch-sensitive surface 202, and interpret the touch input to execute functions or commands. Transparent touch-sensitive surface 203 may utilize any currently known or later developed touch-sensing technologies, including Multi-touch Capacitive Technology, Touch Resistive Technology, Multi-touch Optical Technology, Touch Wave Technology, Force Based Sensing, Near Field Imaging, etc.

In example embodiments of the mobile device, the display may be any of the currently known or later developed display technologies including, but not limited to, Light Emitting Display (LED), Liquid Crystal Display (LCD), Electroluminescent Display (ELD), Organic Light Emitting Diode (OLED), Carbon nanotubes, nanocrystal displays, etc.

Figure 3:
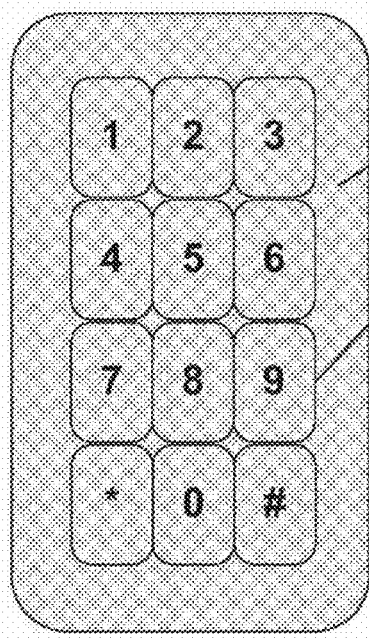
FIG. 3 shows a keypad cover for extending the functionality of a mobile device, according to an example embodiment of the subject disclosure.

FIG. 3 shows a keypad cover 300 for extending the functionality of a mobile device, according to an example embodiment of the subject disclosure. A keypad or a number pad 308 may appear on a designated region of touch-sensitive surface 302 on cover 300. Cover 300 may be adapted to be applied to a mobile device, with keypad 300 being placed convenient to a user's fingers while holding the coupled mobile device. The lines and characters that make up number pad 308 may have texture so that a user can feel number pad 308 without looking, or may simply be printed on cover 300.

In other example embodiments, such prints or textures may cover the back, front, and/or sides of the mobile device or any portion thereof. Covers may include any designs which may be printed, drawn, traced, etched, etc., and any textures which can be carved, molded, thermoformed, etc., including buttons, pads, wheels, sliders, more specific functionality designations, etc. Many other possible designs will become apparent to those having skill in the art upon reading this disclosure. These possible designs can be removably applied to the cover using adhesive, snaps, magnets, or any conceivable coupling mechanism that does not interfere with the touch-sensing functionality described herein.

Figure 4:
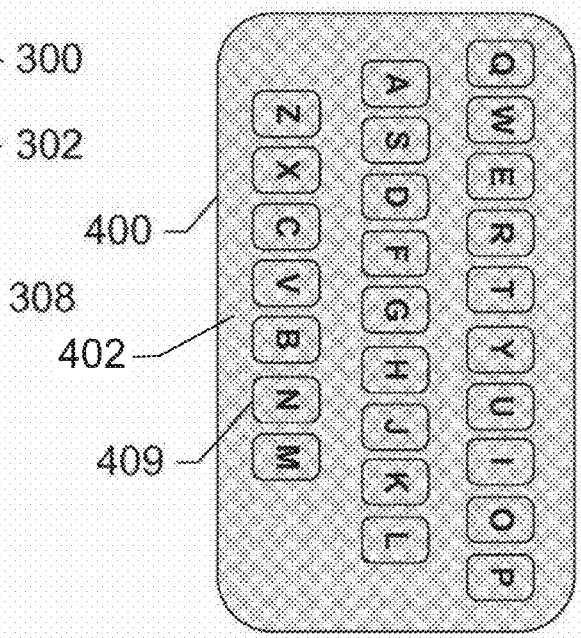
FIG. 4 shows a keyboard cover for extending the functionality of a mobile device, according to an example embodiment of the subject disclosure.

FIG. 4 shows a keyboard cover 400 for extending the functionality of a mobile device, according to an example embodiment of the subject disclosure. A QWERTY keyboard 409 may appear on cover 400, which may be adapted to be applied to the mobile device. A substantial portion of the exterior of cover 400 may be overlaid with touch-sensitive surface 402. Keyboard 409 may have a texture or may simply be printed on cover 400. Cover 400 may cover the back, front, and/or sides of the mobile device, and can include further buttons, pads, wheels, etc., thus extending the functionality of the mobile device to the back and sides.

Figure 5:
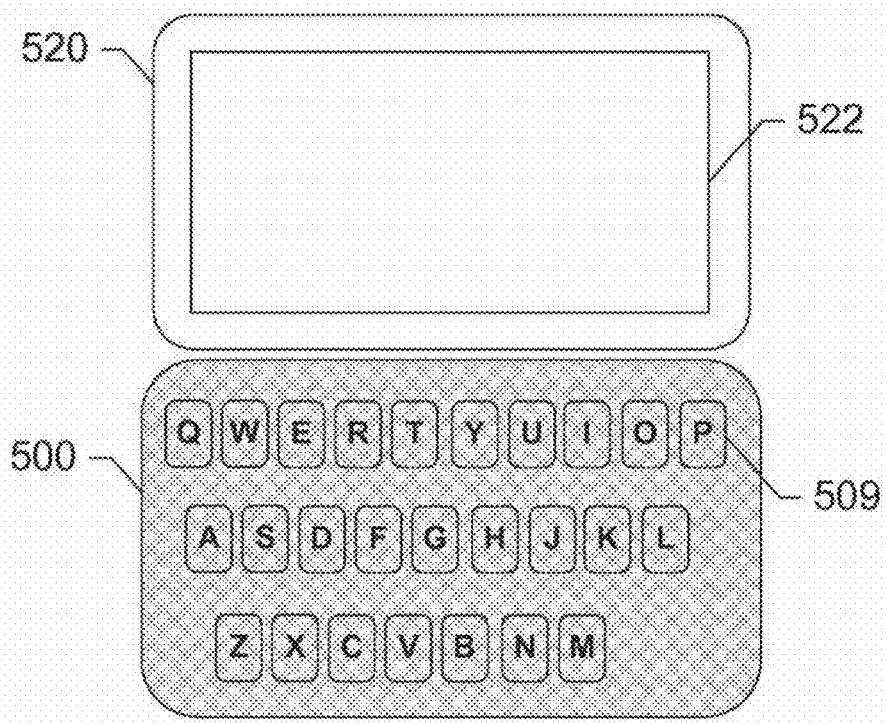
FIG. 5 shows a mobile device and a keyboard cover for extending the functionality of the mobile device, according to an example embodiment of the subject disclosure.

FIG. 5 shows a mobile device 520 and a keyboard cover 500 for extending the functionality of mobile device 520, according to an example embodiment of the subject disclosure. A QWERTY keyboard 509 may appear on cover 500, which may be adapted to be applied to mobile device 520, having a display 522. In addition to the functionality of keyboard 509 as described with respect to FIG. 4, keyboard 500 may further be detached from mobile device 520 for use as a standalone keyboard. Mobile device 520 may maintain communication with cover 500 through wireless or wired communication while cover 500 may be decoupled from mobile device 520. Cover 500 may communicate with mobile device 520 through any currently known or later developed technologies including wireless technologies such as RFID, NFC, BLUETOOTH, WiFi, etc., or wired technologies such as Universal Serial Bus (USB), ETHERNET, etc., using any cable used for transmitting data between devices. Furthermore, the range of wireless communication technologies used or the length of the data transmission cable may determine the distance from mobile device 520 that cover 500 may be placed while keyboard 509 is still capable of communicating with mobile device 520.

In other exemplary embodiments the cover may function as a stand for the mobile device. The user may be able to continue to use the cover as a touch input at the same time the cover is supporting the mobile device. Moreover, several adaptations to the cover may enable the cover to be applied to mobile devices of different styles, makes, and models, such mobile devices having numerous buttons, scroll wheels, pointers, plugs and other interfaces, flip screens, etc. These adaptations may be conceivable to persons having ordinary skill in the art in light of reading this disclosure.

Figure 6A:
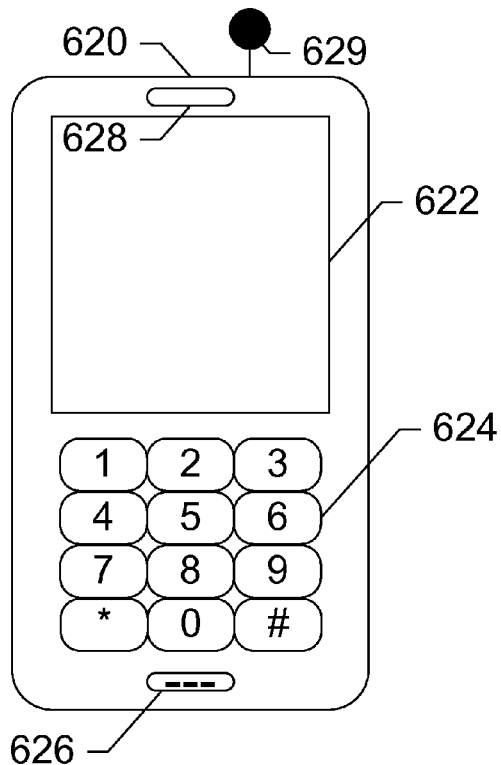
FIGS. 6A-6B show a mobile device configured for extended functionality, according to an example embodiment of the subject disclosure.
Figure 6B:
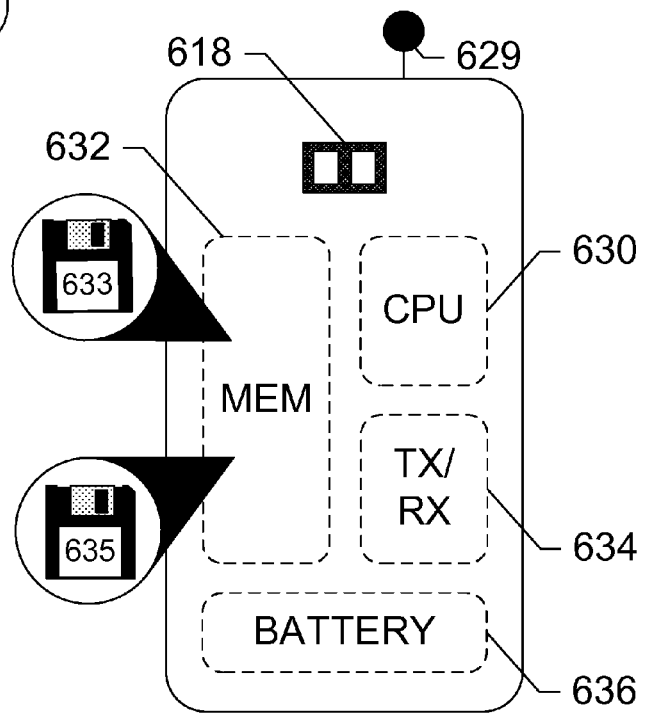

FIGS. 6A-6B show a mobile device 620 configured for extended functionality, according to an example embodiment of the subject disclosure. Mobile device 620 may include a display 622, an input 624, a microphone 626, a speaker 628, and an antenna 629. Display 622 may be used as visual output for mobile device 620, and may be any of the currently known or later developed display technologies including Light Emitting Display (LED), Liquid Crystal Display (LCD), Electroluminescent Display (ELD), Organic Light Emitting Diode (OLED), Carbon nanotubes, nanocrystal displays, etc. For example, display 622 may show a phone number being entered by a user, the status of that number being dialed, and the status of a successful connection to that phone number. Input 624 may be a keypad used, for example, for entering numbers, speed dialing, or carrying out assigned functions. Mobile device 620 may further include a microphone 626 and a speaker 628, through which voice communication with users of other mobile devices is possible. Microphone 626 may be used for aural input, and may be utilized for voice-activated functionalities of mobile device 620. For example, the user may speak the name of a contact whose phone number may be saved on mobile device 620 to command mobile device 620 to dial the contact's phone number automatically. Microphone 626 and speaker 628 may utilize any currently known or later developed technologies including microphones and speakers currently being employed in consumer mobile devices or any other suitable microphone and speaker. Antenna 629 may be a transducer for transmitting and receiving wireless radio frequency (RF) signals to and from wireless networks, network nodes, and other wireless communication devices including a wireless base transceiver station (BTS), WiFi access point, etc.

FIG. 6B shows the inner components of mobile device 620, according to an example embodiment of the subject disclosure. The inner components of mobile device 620 may include a data/power port 618, a processor such as CPU 630, a memory 632 storing an operating system 633 and a touch device logic 635, a transceiver 634, and a battery 636. When coupled with a touch-sensitive cover having a complementary port, port 618 may interface with the complementary port, facilitate data transfer between mobile device 620 and the applied cover, and may receive an output of a touch input from the applied cover. Through port 618, the mobile device may also transmit power to, or receive power from, an applied cover or any other device having a complementary port. Port 618 may include a plurality of electrical contacts that match with electrical contacts on applied covers or other complementary ports.

In other example embodiments, the data/power port can be any wired connection such as USB connection, firewire, serial, parallel, or any proprietary interface connector.

Processor 630 may be used to execute various functions when instructed to do so by programs and other logic stored on memory 632 or any other data storage of mobile device 620 such as a smart card, a memory card slot, etc. Processor 630 can incorporate any presently known or later developed technologies including computer processors (processing units), microprocessors, digital signal processors, controllers and microcontrollers, etc. Operating system 633 may provide an environment for a user to interact with mobile device 620, including managing inputs and outputs for use with operating system 633 and hosting programs running within operating system 633. The operating system may include, for instance, IOS by APPLE®, MICROSOFT WINDOWS, LINUX, PALMOS®, and equivalents thereof. Touch device logic 635, which may be stored on memory 632, can be executed by processor 630 to receive touch input from a cover applied to mobile device 620, and may associate the touch input with a function usable by operating system 633. The function may be a core function of operating system 633, a function or command for an application running on operating system 633, or any combination thereof.

Furthermore, a transceiver 634 may be used to transmit and receive data and signals to and from processor 630 of mobile device 620. Transceiver 634 may utilize any currently known or later developed technologies including Radio Frequency (RF) transceivers, Gigabit Interface Converter (GBIC), small form-factor pluggable transceiver (SFP), enhanced small form-factor pluggable (SFP+), etc. Many wireless communication devices may have more than one transceiver or a transceiver that supports more than one protocol. A single wireless communication device can support cellular radio frequency (RF), Global System for Mobile communications (GSM), General Packet Radio Service (GPRS), Universal Mobile Telecommunication System (UMTS), Wideband Code Division Multiple Access (W-CDMA), Long-Term Evolution (LTE), NFC, WiFi, BLUETOOTH®, ZIGBEE®, and Z-WAVE® protocols. A wireless communication device capable of multiple modes of wireless communication, such as cellular, WiFi, NFC, etc., may contain a plurality of antennas on a single device. For example, an NFC-enabled wireless communication device may have separate antennas for cellular and NFC communications.

Battery 636 may be used to power mobile device 620. Battery 636 can be any of the presently known or later developed technologies used in mobile devices or used in powering communication components including Lithium-Ion batteries, lithium-polymer batteries, molten salt batteries, etc. Further, battery 636 may be charged via a power port (not shown), inductively, or via a power source coupled to a cover applied to mobile device 620

Figure 7:
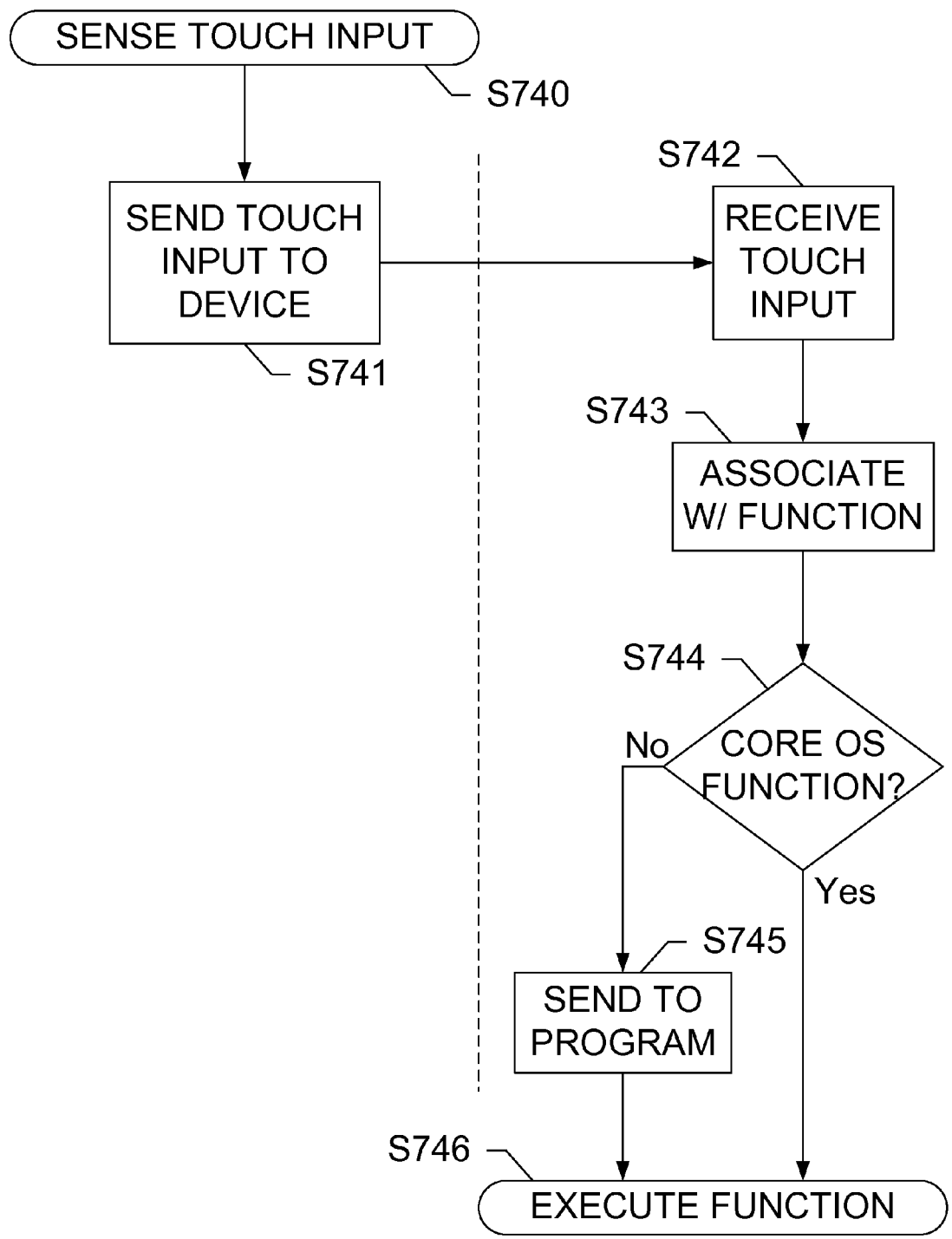
FIG. 7 shows a method for extending the functionality of a mobile device, according to an example embodiment of the subject disclosure.

FIG. 7 shows a method for extending the functionality of a mobile device, according to an example embodiment of the subject disclosure. The method may begin with a touch being sensed (S740) on a touch-sensitive surface of a cover applied to a mobile device. Other occurrences for beginning the method are possible, such as executing a command manually, pushing a hardware button to activate touch sensing, detection of a newly applied cover, etc. In either case, upon instruction from logic stored on the cover, the sensed touch input received at the touch-sensitive surface may be output to the mobile device (S741). The touch input may be received by the mobile device (S742), for instance by being received at a data port of the mobile device, and being transmitted to the processor of the mobile device. Logic within the mobile device may associate the received touch input with a particular function to be executed on the mobile device (S743). At S744, the mobile device may determine whether the desired function is usable by the operating system, or specifically related to a program or application on the mobile device. The program or application may be any presently known or later developed technologies including those currently usable on mobile devices, such as game applications, internet browsing applications, voice recognition applications, camera applications, etc. If the function is determined to be a core operating system function, then the function may immediately be executed (S746) by the operating system. For instance, an operating system function may directly or indirectly modify a hardware component of the mobile device such as a brightness or volume level, power on/off the mobile device, modify core operating system data structures, launch or kill applications, etc. However, if it is determined that the function may not be a core operating system function, then the function may be transmitted to the specific program or application for which the function is intended (S745) to be executed (S746).

Figure 8:
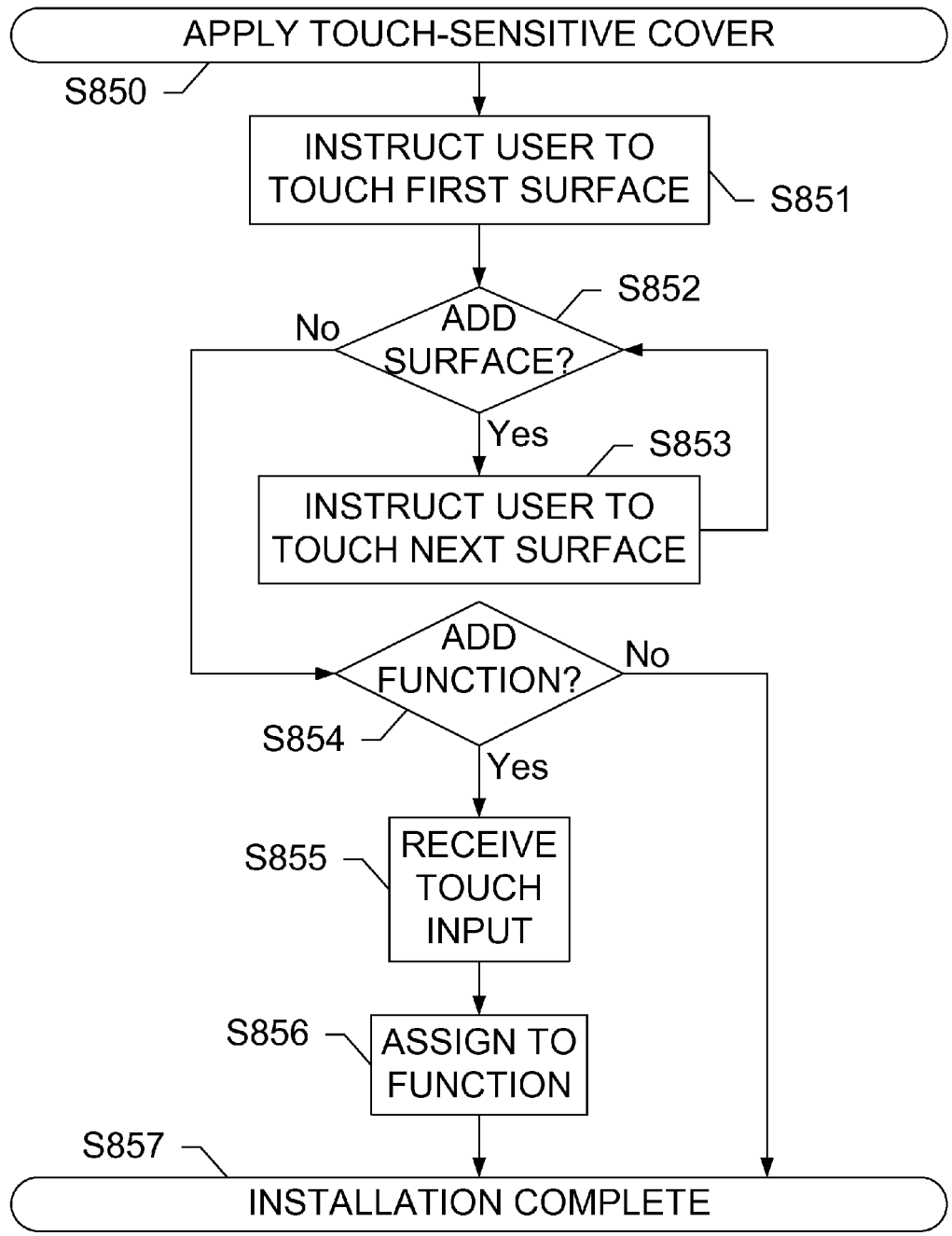
FIG. 8 shows a method for provisioning an extended functionality of a mobile device, according to an example embodiment of the subject disclosure.

FIG. 8 shows a method for provisioning extended functionality of a mobile device, according to an example embodiment of the subject disclosure. Functionality of the mobile device may be extended by customizing the use of a touch-sensitive cover. The customization may include allowing a user to assign functions to tactile maneuvers at one or more locations on the touch-sensitive cover of the mobile device. The method begins as a touch-sensitive cover may be applied to a mobile device (S850), which may require calibration after a first application. Alternatively, the method may begin with a command issued by the user, by automatically detecting a particular touch input, etc. Thereafter, a user of the mobile device may be instructed to touch a first surface (S851). The first surface may be the entire surface, so that the mobile device can associate the touched portion of the touch-sensitive cover with a particular side of the mobile device. Alternatively, the first surface may be any designated touch-sensitive region of the cover, such as a corner, an edge, a center, a portion of a printed/etched keypad, etc. The user may then be asked whether he or she would like to add another surface or region (S852). If the user indicates a positive response, then the user may be asked to touch another surface (S853). Upon doing so, the process may return to S852, where the user may repeat adding surfaces until all desired sides or regions of the mobile device have been added and calibrated, or until the user decides he or she no longer wishes to choose any additional surface. This part of the method may be used to customize and configure the cover to a high level of detail and complexity.

The user may further be asked to add a custom function, such as a tactile maneuver at one or more locations on the mobile device (S854). If the user does not want to add a custom function to a calibrated surface, then the installation may be deemed complete (S857), and the mobile device ready to use with the newly applied cover. If the user desires to add more custom functions to calibrated surfaces and/or regions, then a touch input may be received (S855) and assigned to the custom functions (S856) as described herein. For instance, a user may use touch gestures to specify tolerances around edges, or define regions that the user wants disabled from touch-sensitivity. The user may further define holding patterns, or different types of uses for the mobile device such as being in a pocket, being in one or both hands, resting on a table, etc., all by simulating each situation and letting the logic assign the particular situation to its respective function (S856). Thereafter, the process may end and the installation may be deemed complete (S857).

Figure 9:
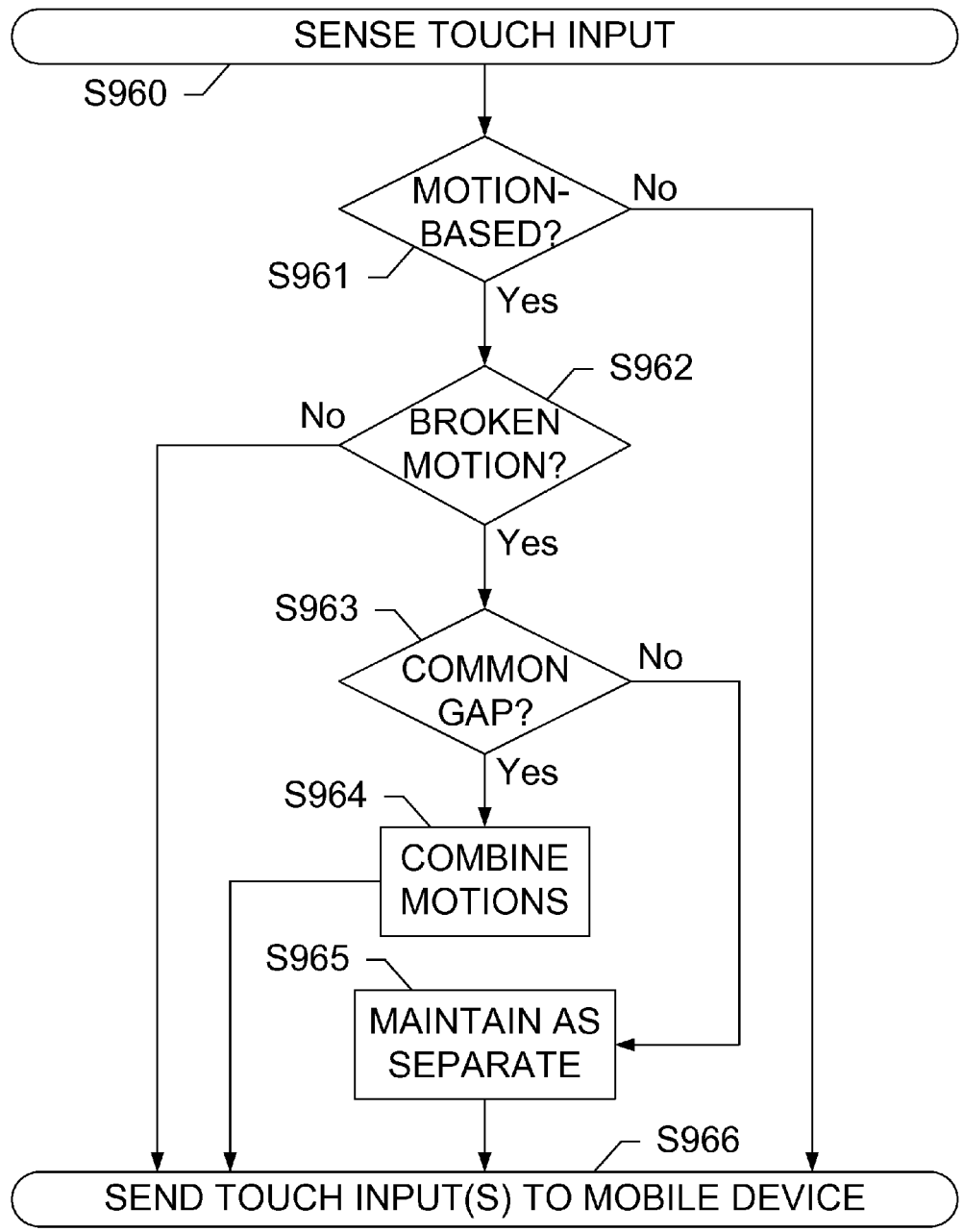
FIG. 9 shows a method for error-correcting extended functionality of a mobile device, according to an example embodiment of the subject disclosure.

FIG. 9 shows a method for error-correcting extended functionality of a mobile device, according to an example embodiment of the subject disclosure. This method may be used to detect whether or not a user has intended to input two or more discontinuous tactile motions constituting a single continuous motion. This error-correcting method can be useful, for example, when a user initiates a tactile motion on a touch-sensitive surface of the mobile device or a touch-sensitive cover of the mobile device, where the tactile motion may encompass an area on the touch-sensitive surface that lacks touch-sensitivity. The lack of touch-sensitivity may be due to a logo window, such as logo window 206 as depicted in FIG. 2A, a damaged touch-surface, a gap between a back-plate and front-plate, sliding keyboard, etc.

The method may begin as a touch input is sensed (S960). Next, the method may determine whether the sensed input is a motion-based input (S961). An example of a motion-based input may be a swipe across a region of a touch sensitive surface, and may be distinguished from a tap on a smaller portion of the touch sensitive surface. If the touch input is not motion-based, then the touch input may be output to the mobile device (S966) as a regular touch input to be translated as a function. If the touch input is motion-based, then the method may determine whether the motion is a broken motion (S962). A broken motion may be a sequence of two or more discontinuous and separate motions. The motion may be determined to be broken by registering multiple motions, varying pressures during the motion, etc. If the motion is not broken, then the touch input may be sent to the mobile device (S966). However, if the motion is broken, for instance upon sensing two or more discontinuous motions, then the method may determine whether the discontinuous and separate motions border a common gap (S963). This determination may occur, for instance, by comparing the two or more discontinuous motions with existing similar continuous motions. The motions may be stored on a database. A close match (to a tolerance) may signify that the discontinuous motions may in fact be intended to be one motion. Moreover, if the discontinuous and separate motions do not border a common gap, then the broken motions may be maintained as separate touch inputs (S965). This submission may occur upon a determination that the user intended to input two separate gestures. Thereafter each touch input is sent to the mobile device (S966). If however, the discontinuous and separate motions do border a common gap, for instance upon matching a known single motion that traverses the gap, then the discontinuous and separate motions may be combined into one fluid and continuous motion (S964). Thereafter, the combined fluid and continuous motion may be sent to the mobile device (S966).

Figure 10:
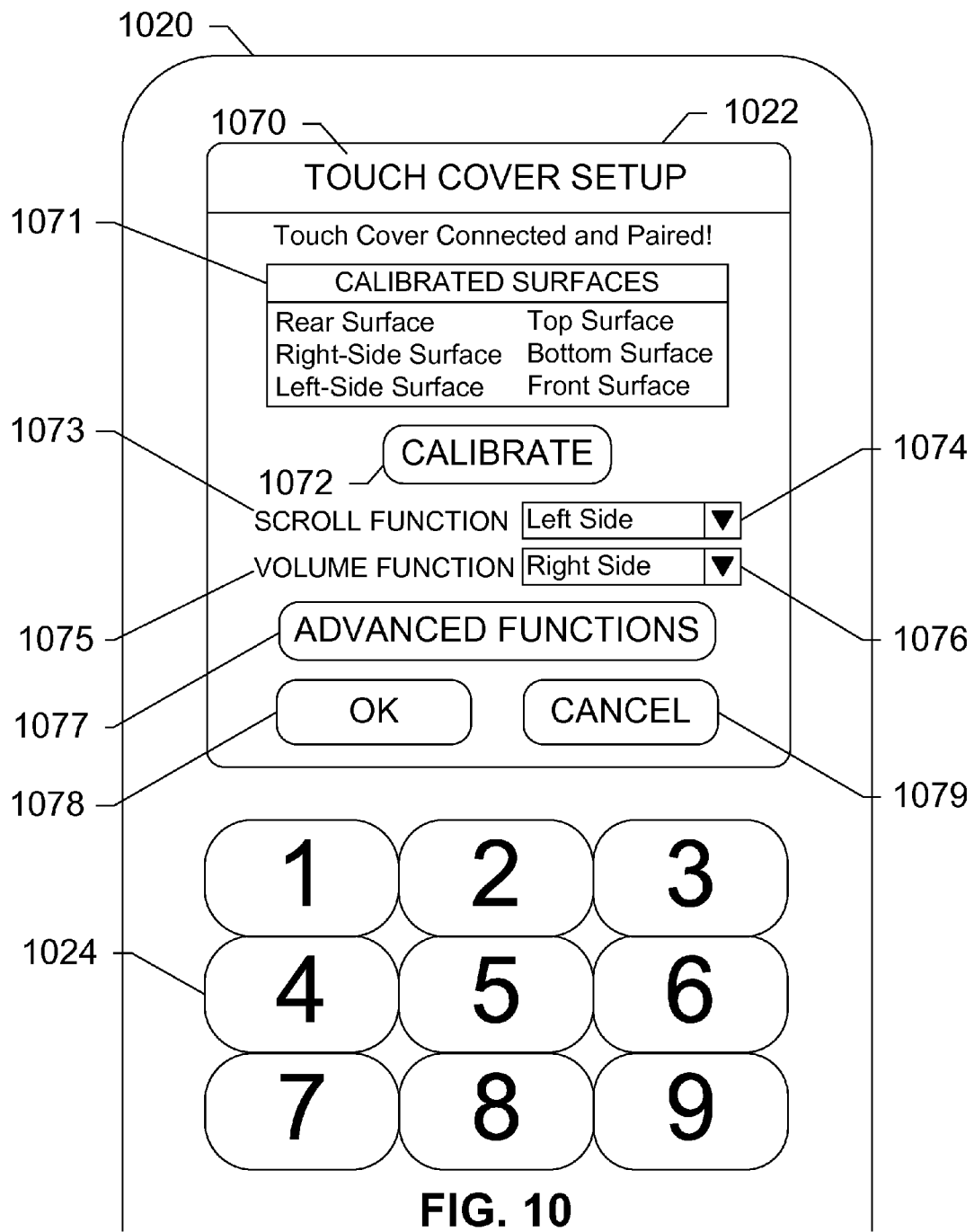
FIG. 10 shows a screen-shot of a user interface for provisioning and editing extended functionality of a mobile device, according to an example embodiment of the subject disclosure.

FIG. 10 shows a screen-shot of a user interface for provisioning and editing extended functionality of a mobile device 1020, according to an example embodiment of the subject disclosure. Mobile device 1020 may include a display 1022 showing a touch cover setup program 1070, and a keypad 1024. Touch cover setup program 1070 may include a list of calibrated surfaces 1071, a calibration button 1072, a scroll function 1073 and associated scroll location 1074, a volume function 1075 and associated volume location 1076, an advanced functions button 1077, a confirmation button 1078, and a cancellation button 1079.

Calibrated surfaces 1071 may include the various surfaces on the cover of the mobile which can be assigned to different function(s). Calibration button 1072 may be used to add and calibrate surfaces of new or existing touch-sensitive surfaces in communication with mobile device 1020. Scroll location 1074 and volume location 1076 may utilize drop-down menus to assign different locations on the touch-sensitive surface to scroll function 1073 and volume adjustment function 1075, respectively. Aside from the basic functions such as adjusting volume or scrolling, more advanced functions can be assigned to various locations of the mobile device cover. Such advanced functions can be accessed through advanced functions button 1077. Activating confirmation button 1078 may terminate the setup program and store the chosen settings in a memory of mobile device 1020. However, if the user is not satisfied with the touch cover setup, then cancellation button 1079 can be activated to undo or cancel the latest calibration, function, or other feature of touch cover setup 1070.

For mobile devices that have folding or sliding keypads, keyboards, flip screens, etc., or otherwise change physical state, custom functions can be assigned to specified states. For instance, when changing the state of a mobile device, logic on the mobile device may adapt to respond to a set of custom functions assigned to the new state, perhaps by loading the set of custom functions from an onboard database, with each set being associated with a separate state. Logic on the mobile device can also be calibrated to disregard or ignore certain touch inputs. For example, the mobile device can memorize contact points on the touch-surface that are activated when the user is simply holding the mobile device or when the mobile device is in a pocket or carrying case. When the mobile device detects these inputs, or a combination of inputs, the mobile device assumes the user does not intend to input touches as functions, but is simply holding the device. Under this assumption, the mobile device may ignore the inputs or combination of inputs.

The foregoing disclosure of the example embodiments of the subject disclosure has been presented for purposes of illustration and description. It is not intended to be exhaustive or to limit the subject disclosure to the precise forms disclosed. Many variations and modifications of the embodiments described herein will be apparent to one of ordinary skill in the art in light of the above disclosure. The scope of the subject disclosure is to be defined only by the claims appended hereto, and by their equivalents.

Further, in describing representative embodiments of the subject disclosure, the specification may have presented the method and/or process of the subject disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the subject disclosure should not be limited to the performance of their steps in the order written, and one skilled in the art can readily appreciate that the sequences may be varied and still remain within the spirit and scope of the subject disclosure.

What is claimed is:

1. A cover for extending functionality of a mobile device, the cover comprising:
   a touch-sensitive surface overlaying a portion of an exterior of the cover;
   a processor; and a memory storing instructions that, when executed by the processor, cause the processor to perform operations comprising sensing a touch input from the touch-sensitive surface, transmitting the touch input to the mobile device, wherein the touch input is transmitted wirelessly to the mobile device, and correcting an error associated with the touch input, the error based on a gap in the touch-sensitive surface.

2. The cover of claim 1, wherein the cover is substantially rigid.

3. The cover of claim 1, wherein the cover is substantially flexible.

4. The cover of claim 1, wherein the cover is applied to the mobile device using an adhesive.

5. The cover of claim 1, wherein the touch-sensitive surface includes a printed design.

6. The cover of claim 1, wherein the touch-sensitive surface includes a texture.

7. The cover of claim 1, wherein the touch input comprises a first touch input and a second touch input and wherein correcting the error associated with the touch input comprises combining the first touch input and the second touch input into a single touch input.

8. The cover of claim 1 claim 1, further comprising a wireless transceiver.

9. The cover of claim 1, further comprising a battery.

10. The cover of claim 9, further comprising a solar charger configured to charge the battery.

11. The cover of claim 9, further comprising a kinetic charger configured to charge the battery.

12. A computer-readable storage medium storing computer-executable instructions that, when executed by a processor of a mobile device, cause the processor to perform operations comprising:

receiving a first touch input from a cover of the mobile device, the cover comprising a touch-sensitive surface;

calibrating, based on the first touch input, the touch-sensitive surface;

receiving a second touch input from the cover of the mobile device; and associating the second touch input with a function usable by an operating system of the mobile device.

13. The computer-readable storage medium of claim 12, wherein the operations further comprise assigning the function to the second touch input.

14. The computer-readable storage medium of claim 12, wherein the operations further comprise determining that the function is a core operating system function.

15. A computer-readable storage medium storing computer-executable instructions that, when executed by a processor of a cover, cause the processor to perform operations comprising:

sensing a touch input from a touch-sensitive surface of the cover, the touch-sensitive surface overlaying a portion of an exterior of the cover, the cover associated with a mobile device;

correcting an error associated with the touch input, the error based on a gap in the touch-sensitive surface; and transmitting the touch input to the mobile device, wherein the mobile device receives and associates the touch input with a function usable by an operating system.

16. The computer-readable storage medium of claim 15, wherein the touch input comprises two separate motion-based touch inputs and wherein correcting the error includes combining the two separate motion-based touch inputs bordering the gap into a single motion-based touch input.

17. The computer-readable storage medium of claim 16, wherein correcting the error includes sending the single motion-based touch input to the mobile device instead of the two separate motion-based touch inputs.

* * * * *